(No Model.)  4 Sheets—Sheet 1.
G. W. TAYLOR.
GIN SAW SHARPENER.

No. 600,458.  Patented Mar. 8, 1898.

Witnesses  Inventor
Jas. W. McCathran  George W. Taylor
  By his Attorneys, C. A. Snow & Co.

(No Model.) 4 Sheets—Sheet 2.
G. W. TAYLOR.
GIN SAW SHARPENER.
No. 600,458. Patented Mar. 8, 1898.
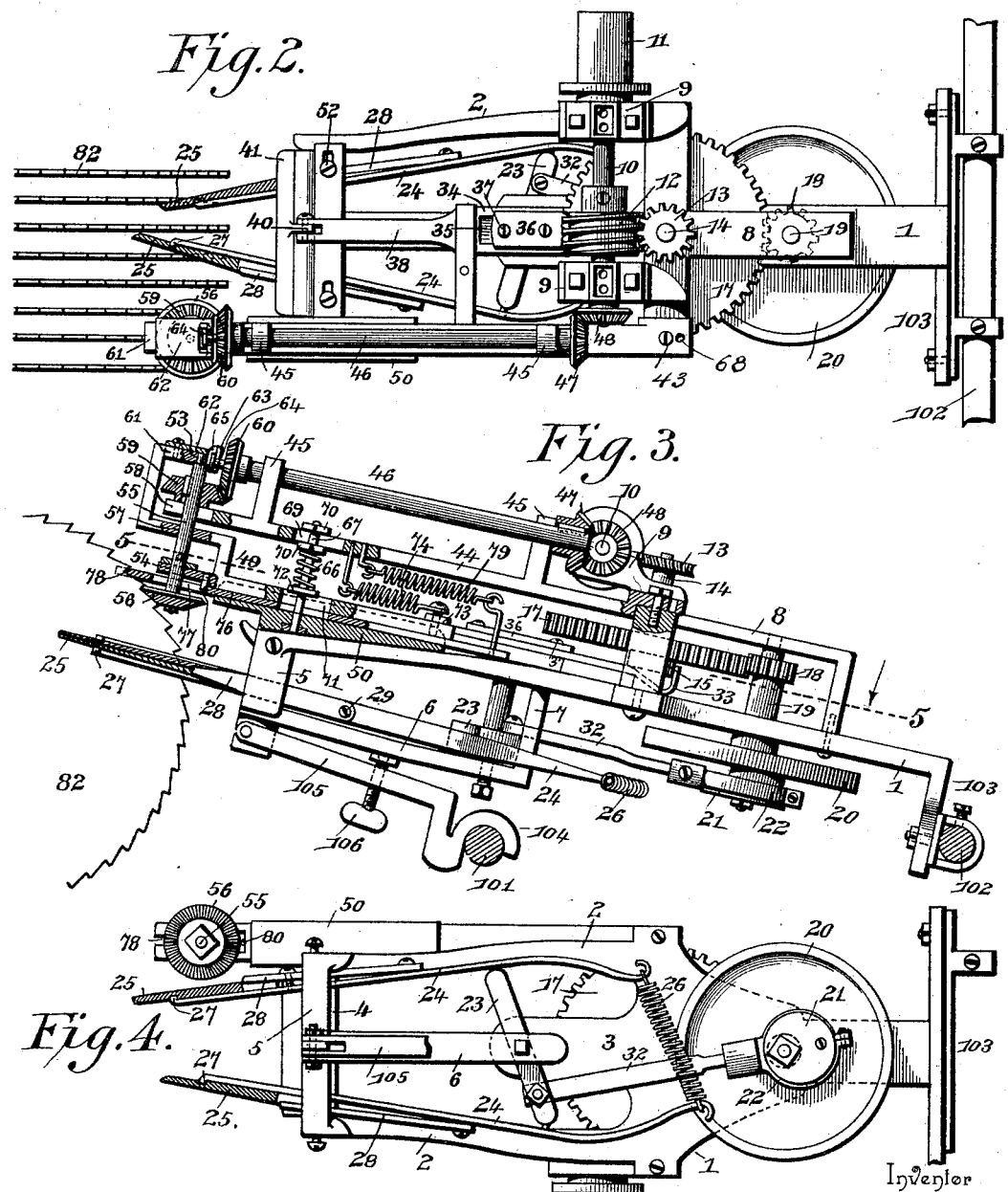
Witnesses
Inventor
George W. Taylor
By his Attorneys, (No Model.) 4 Sheets—Sheet 3.

G. W. TAYLOR.
GIN SAW SHARPENER.

No. 600,458. Patented Mar. 8, 1898.

Witnesses
Jas. H. McCathran

Inventor
George W. Taylor
By his Attorneys,
C. A. Snow & Co.

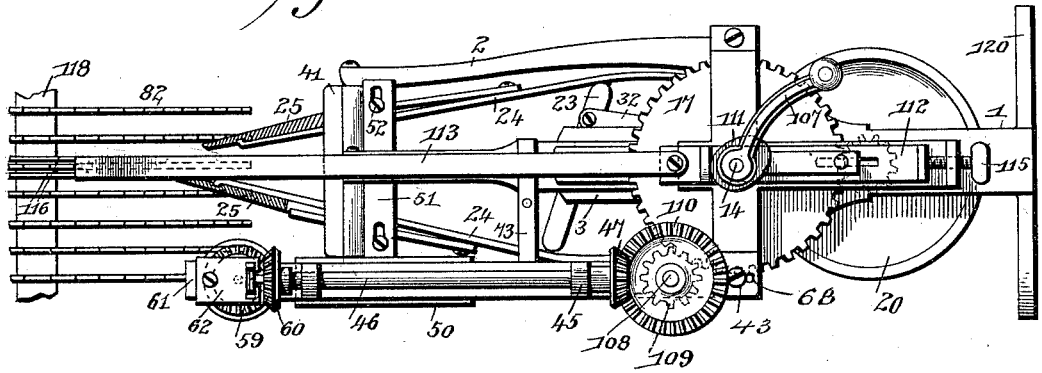

UNITED STATES PATENT OFFICE.

GEORGE W. TAYLOR, OF BELTON, SOUTH CAROLINA, ASSIGNOR OF ONE-HALF TO WILLIAM ALONZO BRECKENRIDGE, OF LAURENS, SOUTH CAROLINA.

GIN-SAW SHARPENER.

SPECIFICATION forming part of Letters Patent No. 600,458, dated March 8, 1898.

Application filed December 11, 1896. Serial No. 615,359. (No model.)

*To all whom it may concern:*

Be it known that I, GEORGE W. TAYLOR, a citizen of the United States, residing at Belton, in the county of Anderson and State of South Carolina, have invented a new and useful Gin-Saw Sharpener, of which the following is a specification.

My invention relates to a gin-saw sharpener and gummer; and the objects in view are to provide a simple and efficient construction and combination of parts whereby the gummer or rotary file is guided in its entrance to the throat of the tooth to insure the accurate operation thereof, to provide improved means for withdrawing the gummer and coacting parts from contact with the saw during the forward-feeding movement of the latter to avoid injuring the points of the teeth, to provide means for filing the teeth outwardly or from their throats toward their points as the operation proceeds, to provide means in connection with the gummer or rotary file for removing the bur formed at the sides of the teeth and otherwise smoothing and pointing the teeth from the sides, and, furthermore, to provide means for securing automatic and manual adjustment of the parts to suit saws having teeth spaced at different intervals and with the faces of their teeth arranged at different angles.

Further objects and advantages of this invention will appear in the following description, and the novel features thereof will be particularly pointed out in the appended claims.

Figure 1:
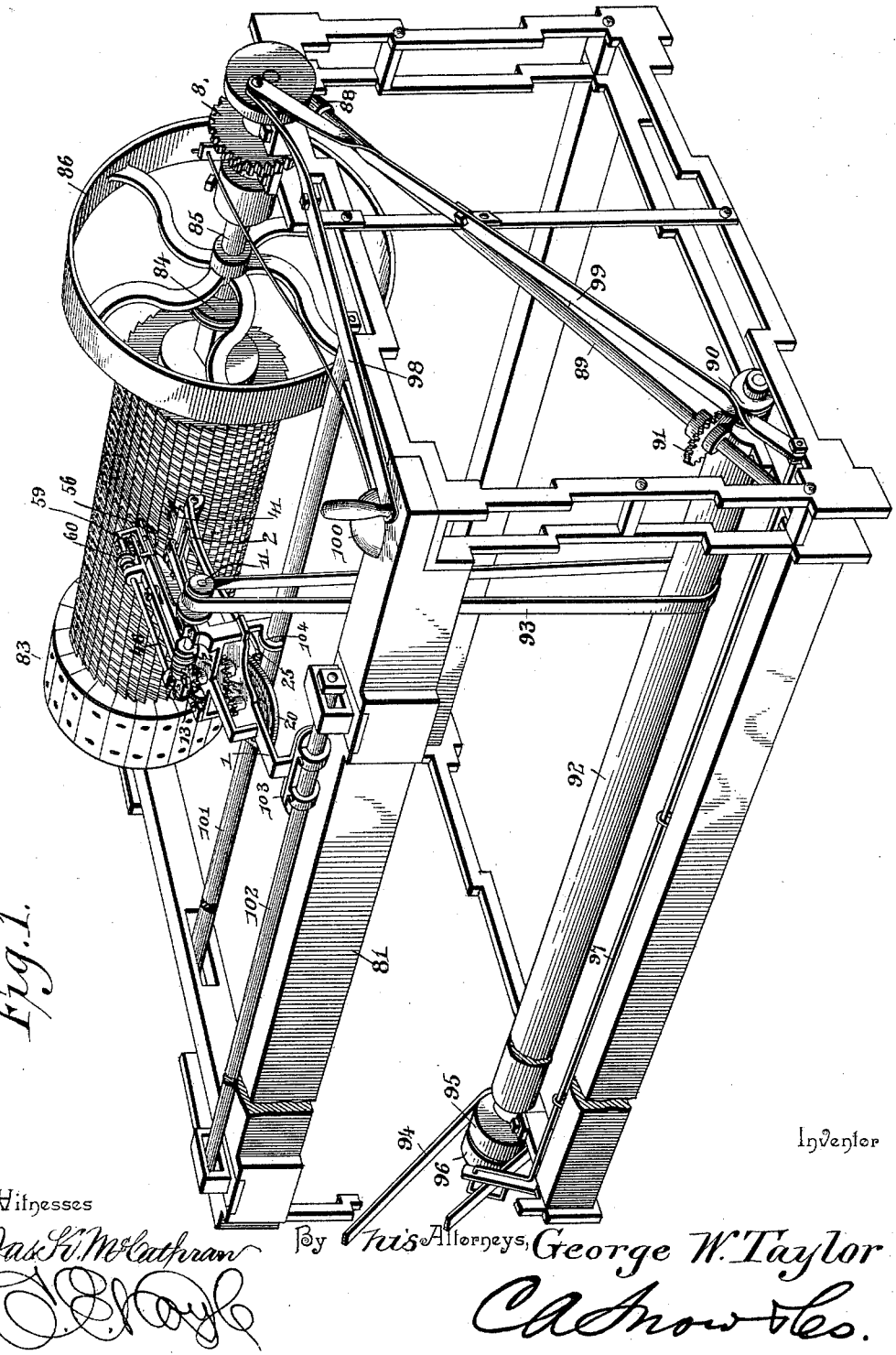
Figure 5:
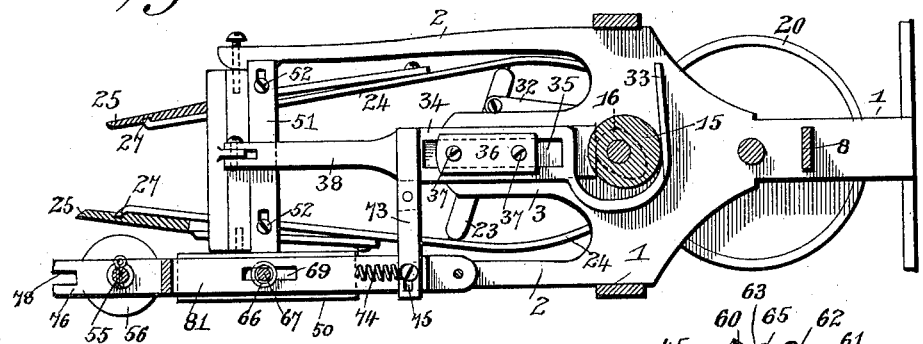
Figure 6:
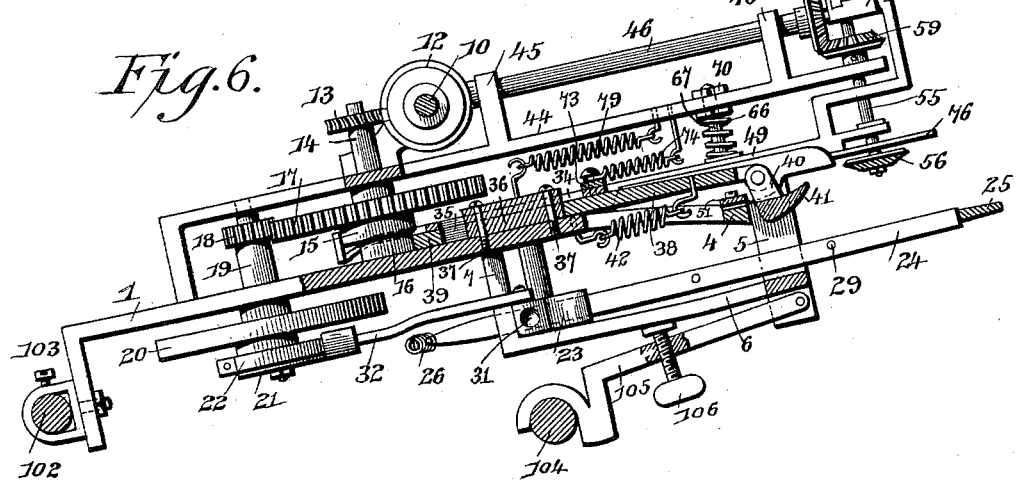
Figure 7:
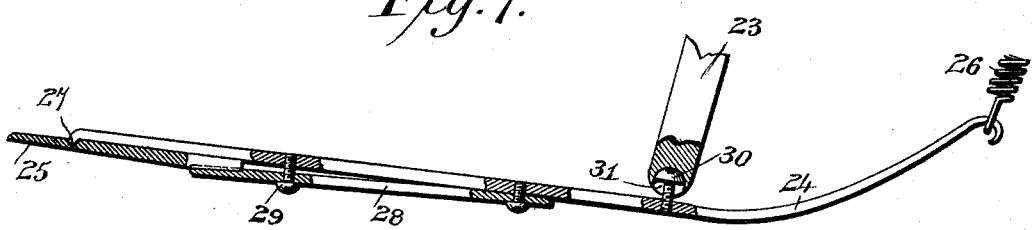

In the drawings, Figure 1 is a perspective view of a machine constructed in accordance with my invention, the same being adapted for operation by power, as through a belt or other form of gearing. Fig. 2 is a plan view of the sharpening-machine detached from the supporting-frame and the means for communicating motion thereto. Fig. 3 is a side view, partly in section, in the plane of the axis of the counter-shaft. Fig. 4 is a bottom plan view. Fig. 5 is a horizontal section on the line 5 5 of Fig. 3 through the eccentric, whereby the slide for the carriage is operated. Fig. 6 is a central longitudinal section. Fig. 7 is a detail sectional view of one of the file-carrying arms and contiguous parts. Fig. 8 is a plan view of a slightly-modified form of the apparatus adapted for manual operation, as by a crank. Fig. 9 is a side view of the same, showing the means for supporting the front end thereof. Fig. 10 is a detail view of the front end of the supporting-arm.

Similar numerals of reference indicate corresponding parts in all the figures of the drawings.

Referring to Figs. 2 to 7, inclusive, the apparatus embodying my invention includes a base-plate 1, provided with forwardly-extending fixed side arms 2 and an intermediate tongue 3, said side arms being connected contiguous to their front ends by a cross-bar 4, while depending from the extremities of said side arms is a stirrup 5, connected centrally by a rearwardly-extending longitudinal brace 6, with a post 7 depending from said tongue 3.

Arranged upon the base-plate is a three-armed bracket 8, of which the lateral arms are constructed to form bearings 9, in which is mounted the transverse driving or main shaft 10, provided in the construction illustrated with a driving-pulley 11 and a worm 12. Meshing with the worm is a worm-gear 13, fixed to a cam-shaft 14, which carries an eccentric 15 and a subjacent cam 16. Said cam-shaft also carries a gear 17, meshing with a pinion 18 on a balance-wheel spindle 19, and located below the balance-wheel 20 is an eccentric 21, of which the strap 22 is connected by suitable means with a rocker or rocking lever 23, fulcrumed at an intermediate point upon the brace 6 below the plane of the base-plate. Connected with the extremities of this rocker are the file-carrying arms or fingers 24, which support the reciprocatory files 25 of the ordinary sectionally triangular construction. These file-fingers operate through and are supported by the stirrup 5, being limited in their outward movement by the sides of the stirrup and being pivotally connected to the extremities of the rocker to allow inward-swinging movement of the front or file-carrying extremities thereof. Furthermore, the file-fingers extend in rear of the rocker and are terminally connected by a contractile spring 26, whereby the file-carrying extremities thereof are yieldingly held separated or in contact with the sides of the stirrup, but are adapted to be moved inwardly to arrange the files in contact with the facing sides of contiguous saws, against which they are adapted to have yielding pressure. The files may be secured to the fingers in any suitable manner, as by seats 27, at the front extremities of the fingers for engaging the back of the file and a clamp-plate 28, engaging the tail of the file and held in place by means of screws 29 or their equivalents.

The file-fingers are also arranged for vertical swinging movement or play in the stirrup between the lower side thereof and the under surface of the cross-bar 4, as clearly shown in Fig. 6, and hence a universal connection is preferably employed between the intermediate points of the fingers and the extremities of the rocker, the connection illustrated in the drawings consisting of ball-and-socket joints, of which the balls or heads 30 are carried by the file-fingers, while open-sided sockets 31 are formed in the rocker to adapt the file-fingers to be dismounted with facility, as by spreading the rear ends thereof against the tension of the contractile spring 26. The connection between the eccentric-strap 22 and the rocker consists of a pitman 32.

Arranged with its shoe 33 in operative relation with the eccentric 15 is a slide 34, having a slot 35, which receives a fixed guide 36, secured to the base-plate by means of screws 37, and mounted upon the same guide is a push-bar 38, having its shoe 39 arranged in the path of the cam 16, said push-bar being connected at its front end to the upwardly-extending arm 40 of a trip 41, located above and adapted to be depressed at its front edge to strike and depress the front end of the file-fingers, and thus remove them from operative contact with one tooth into similar contact with the next tooth. The push-bar is yieldingly held in its normal position by means of a contractile spring 42.

Pivotally mounted, as at 43, on the bracket 8 is a carriage-guide arm 44, provided with bearings 45, in which is mounted a counter-shaft 46, connected by bevel-gears 47 and 48 with the driving or main shaft 10. Coöperating with the guide-arm 44 and combining therewith to form a guide for the reciprocatory carriage 49 is a guide-shoe 50, provided with a lateral arm 51, arranged upon the cross-bar 4 and slotted to receive set-screws 52, by which the carriage-guide is locked at any desired angular adjustment to suit the intervals between the saws on a gin-shaft. The carriage consists of a horizontal member fitted in the guide-shoe and extended at its front end to form upper and lower bearings 53 and 54 for the rotary-file spindle 55, carrying a rotary or disk file 56. The carriage is also provided with an intermediate bearing 57, and the guide-arm 44 is extended at its front end to form a slotted finger 58, through which the disk-spindle extends. The disk-spindle carries a bevel-gear 59, meshing with a similar gear 60 on a counter-shaft 46, said gear 59 being supported by the finger or extension 58 of the guide-arm and being fitted to slide upon the spindle 55, whereby the spindle is adapted to slide axially through the gear, the gear being feathered upon the spindle. The upward extension 61 of the carriage, in which said upper and lower bearings 53 and 54 are formed and which is of irregular or S shape, carries at its extremity a double-eared clip-plate 62, of which the ears 63 engage an annular groove 64 in the end of the counter-shaft 46, the holding-ears 63 being arranged contiguous to a pair of parallel upstanding guide-arms 65, between which the terminal head of the shaft operates to prevent lateral relative vibration of the parts. The carriage is capable of vertical vibration or yielding movement for a purpose hereinafter explained, such movement, by reason of the sliding connection between the spindle 55 and the gear 59, being accomplished independently of said gear and being yieldingly resisted by a return-spring 66, which is arranged upon a pin 67, connecting the guide-shoe 50 with the guide-arm 44. The guide-arm 44 is preferably provided with a plurality of openings 68 for engagement by the pivot-screw 43, whereby said arm is capable of longitudinal adjustment, and the said arm is slotted, as shown at 69, to receive the pin 67, and the pin being held in the desired position with relation to the guide-arm by means of upper and lower nuts 70.

From the above description it will be seen that rotary motion is communicated to the gummer or disk file through the counter-shaft 46, and it has also been explained that the carriage is capable of vertical yielding movement irrespective of the guide and in opposition to the tension of the return-spring 66; but in addition to these movements the carriage is capable of reciprocatory movement to advance it toward and move it from the saw, for which purpose the bar forming the body portion thereof is provided with a slot 71, through which the pin 67 extends, a bearing-plate 72 being arranged upon the upper surface of the carriage to receive the downward pressure of the spring 66. This reciprocatory movement of the carriage is communicated thereto by the alternate action of the eccentric 15 and slide 34, said slide being provided with a lateral arm 73, which is connected to the carriage, and a return or advancing spring 74, connecting the carriage with the guide-arm 44, and in order to allow lateral adjustment of the carriage-guide independently of the slide 34 said arm 73 is provided with a slot 75. In order to maintain the engagement of the parts of the gearing in all positions of the carriage, the counter-shaft 46 is fitted to slide loosely in the gear 47, the hub of said gear bearing against the rear bearing 45 of the guide-arm and being feathered upon the shaft to communicate rotary motion thereto. The axial movement of the counter-shaft in accordance with the movements of the carriage is communicated by means of the clip 62, carried by the carriage and engaging the annular groove in the extremity of the shaft.

Arranged to coöperate with the carriage in its forward and rearward reciprocatory movement is a file-guide 76, mounted to slide in the guide-shoe 50 and provided with a slot 77, through which extends the disk-spindle 55. This file-guide is provided with a bifurcated or notched front end or seat 78, designed to straddle the saw which is being operated upon by the disk file and engage the throats of the teeth successively, the same being yieldingly held in its advanced position by means of an actuating-spring 79 and being removed from contact with the saw at intervals by means of the carriage, which carries a depending stud 80, operating in the slot 77.

The mechanism as above described is preferably used in connection with a supporting-frame 81 and suitable saw-feeding mechanism, whereby the teeth of the saws are brought successively into operative relation with the filing devices. In this connection I preferably employ a continuous feed, whereby a uniform rotary movement is imparted to the gin-shaft which carries the saws 82, said means including opposite chucks 83 and 84, the latter being carried by a feed-shaft 85, provided with a balance-wheel 86. The feed-shaft also carries a worm-gear 87, with which meshes a worm 88, carried by a spindle 89, and a similar speed-reducing gear, consisting of a worm 90 and worm-gear 91, communicates motion from a driving-pulley or drum 92 to the spindle 89, said driving-pulley or drum being connected by means of a belt 93 with the pulley 11 above described. Motion may be communicated to the driving-pulley by any suitable means, as a driving-belt 94, fixed and loose pulleys 95 and 96 being arranged upon the spindle of the drum 92. Also a suitable belt-shifting device 97 is preferably employed, the same being operated by means of a hand-lever 98 and an intermediate lever 99, which is connected with the slide-rod which carries the shoe of the belt-shifter. Also a suitable alarm mechanism, including a gong 100, having any suitable or preferred construction, is used in connection with the feed-shaft 85 to indicate to the operator when said shaft has made one complete revolution, and hence that all of the teeth of a saw have been successively arranged in operative relation with the filing devices, thus warning the operator to apply the filing apparatus to the next saw.

The means which I have illustrated in connection with the framework for supporting the filing apparatus consist of front and rear guide-rods 101 and 102, the same being provided, preferably, with means whereby they may be adjusted forwardly and rearwardly to suit the diameters of different saws. The rear end of the base-plate 1 of the apparatus is extended to form a shoe 103, which fits the rear guide-rod 102, while resting upon the forward guide-rod is a shoe 104, forming a part of a support 105 for the front end of the apparatus. Threaded in this support is an adjusting-screw 106, which bears terminally against the under side of the brace 6, and it is obvious that by adjusting said screw the front end of the filing apparatus may be elevated or lowered to suit the angle upon which the faces of the teeth of the saw are arranged. The filing apparatus is adapted to be moved parallel with the guides to arrange it in position to operate upon different saws.

The operation of the mechanism as above described is as follows: Having placed the gin-shaft in position upon the framework, the file-guide 76 is engaged with the throat of one of the teeth of a saw, and the screw 106 is adjusted to arrange the disk file to suit the angle of the tooth contiguous to which it is located. Also the front ends of the file-fingers are drawn together and arranged with the files in contact with the inner or facing sides of two of the saws, the carriage-guide having been adjusted laterally by the means provided for that purpose (including the slotted arm 51) to secure the proper relative positions of the reciprocatory and rotary files to suit the intervals between the saws. Having accomplished these adjustments, motion is communicated to the mechanism by shifting the driving-belt 94 to the fixed pulley. The speed-reducing gearings which are interposed between the drum 92 and the feed-shaft cause the latter to rotate at a very low rate of speed, and simultaneously with this feeding movement the disk is rotated in contact with the contiguous tooth of the saw. Inasmuch as the feeding motion is continuous, it will be seen that as the filing proceeds the tooth in contact with which the file is arranged moves upwardly, and simultaneously therewith the eccentric 15 imparts a rearward movement to the carriage and the disk traverses the tooth from its throat toward its point or extremity. During this operation the file-guide holds the disk in the proper position with relation to the tooth without preventing the upward movement of the disk caused by the pressure of the tooth against the under side thereof, said upward movement being accomplished against the tension of the return-spring 66. This upward yielding quality of the carriage is designed to prevent injury to the teeth without interfering with the filing thereof. When the disk has finished the grinding of a tooth and before the saw has advanced sufficiently to expose the point of the tooth to the surface of the file, the file is withdrawn from contact with the tooth by means of the eccentric, the guide also being disengaged by the contact of the stud 80 with the rear end of the slot 77. This retraction of the disk and guide continues a sufficient length of time to allow the point of the tooth which has been operated upon to pass the disk, when the forward movement of the disk allows the guide to strike the back of the tooth and slide down the same to the throat, thus causing the disk to enter the throat of the next tooth accurately and without injury to the face thereof. After the seat of the guide has reached its place in the throat of a tooth the forward movement of the disk continues until it is in operative position, but such subsequent movement is directly under the control of the guide, thus insuring the proper application of the grinding-surface. In other words, the disk is capable of reciprocatory movement independently of the guide, but is connected therewith by means of the stud 80 and slot 77 to insure the retraction of the guide sufficiently to release one tooth and engage the next; but this retraction of the guide does not carry the bifurcated extremity thereof out of engagement with the saw. In other words, the depth of the notch or bifurcation in the extremity of the guide is greater than the throw of the guide, whereby the sides of said notch or bifurcation always overlap the sides of the saw-blade to insure the proper return of the parts when the disk is advanced. It will be seen also that the carriage and file-guide are provided with independent actuating-springs whereby the backward movement of the disk commences independently of the guide and proceeds without affecting the seating of the front end of the guide upon the tooth of the saw until the stud 80 engages the guide and withdraws it to allow the point of a tooth to pass.

The files 25, which receive a reciprocatory movement, are designed to remove the bur or roughness produced at opposite sides of a tooth by the operation of the disk file, said reciprocatory files operating in the throats of the teeth of the saws with which they are engaged and yielding upwardly as the saws advance. In this way the filing of a tooth is commenced at the throat thereof and proceeds outwardly or toward the point thereof, and at the moment that the disk file and file-guide are withdrawn from contact with the saw being operated upon to allow the points of the teeth to pass the trip 41 is depressed by the cam 16 to tap the file-fingers 24, and thus quickly lower the files 25 to engage with the next succeeding teeth of the saws and avoid scouring the sides of the teeth in passing from one to the next.

In the modified construction illustrated in Figs. 8 to 10, inclusive, the same general construction and arrangement of parts are employed, with the exception that the cam-shaft 14 carries a crank-arm 107 and is connected by means of the gear 17 with a spindle 108, having a pinion 109. This spindle 108 also carries a bevel-gear 110, meshing with the bevel-gear 47, similar to that described in connection with the power-operated mechanism and arranged on the sliding shaft 46. Said cam-shaft also carries a feed-cam 111, arranged to coöperate with a feed-slide 112, carrying a feed finger or pawl 113 to engage successively the teeth of the saw being filed. A return-spring 114 is connected to the feed finger or pawl, and an adjustable stop 115 is arranged in the path of the rearward movement of the slide to vary the throw of the finger to suit the interval between contiguous teeth of the saw.

A further difference of construction existing in the manually-operated apparatus resides in the construction of the support 116, which is pivoted, as at 117, to a depending ear on the brace 6 and is bifurcated to receive the saw being filed, the front extremity of the support resting upon the gin-shaft, which is shown at 118. This support 116 also carries an adjusting-screw 119, which bears against the under side of the brace 6 to provide for the angular adjustment of the apparatus in a manner similar to that described in connection with the brace 105 of the power-operated mechanism, the rear end of the base-plate 1 being extended to form a foot or rest 120, adapted to bear upon a scantling or other horizontal surface (not shown) which is arranged parallel with the gin-shaft.

Various changes in the form, proportion, and the minor details of construction may be resorted to without departing from the spirit or sacrificing any of the advantages of this invention.

Having described my invention, what I claim is—

1. In a saw-sharpening machine, the combination of a disk file adapted to enter the throats of the teeth, a reciprocatory carriage supporting said file, reciprocatory files adapted to operate in contact with opposite sides of each tooth, a guide for said carriage mounted for lateral adjustment, to vary the interval between the reciprocatory and disk files, means for securing the guide at the desired adjustment, and means for actuating the files, substantially as specified.

2. In a saw-sharpening machine, the combination with saw-feeding devices of reciprocatory files mounted for pivotal movement and adapted to operate in contact with the sides of saw-teeth, means for reciprocating the files, a trip arranged in the path of the files and adapted to be moved in a plane transverse thereto to tap the files and thereby remove them from engagement with one tooth and into engagement with the succeeding tooth, and actuating devices for the trip, substantially as specified.

3. In a saw-sharpening machine, the combination with a frame and saw-feeding devices, of a reciprocatory carriage supporting the file, a yielding file-guide adapted to be advanced with and repressed independently of the carriage and provided with a terminal seat to engage the throat of a tooth contiguous to that engaged by the file, and means for actuating the carriage, substantially as specified.

4. In a saw-sharpening machine, the combination with a disk file and means for actuating the same, of a reciprocatory carriage supporting the file, a yielding file-guide connected to the carriage for advance and return movement therewith, the carriage being capable of additional advance movement independently of the guide, and means for actuating the carriage, substantially as specified.

5. In a saw-sharpening machine, the combination with a disk file and means for actuating the same, of a reciprocatory carriage supporting the file, a file-guide connected to the carriage for advance and return movement therewith, yielding means for advancing the carriage and guide, and means for retracting the same against the tension of said yielding means, substantially as specified.

6. In a saw-sharpening machine, the combination with a disk file and means for actuating the same, of a reciprocatory carriage supporting the file, a file-guide connected to the carriage for advance and return movement therewith, independent yielding means for advancing the carriage and guide, and means for returning the carriage, substantially as specified.

7. In a saw-sharpening machine, the combination with a disk file and means for actuating the same, of a reciprocatory carriage supporting the file, a file-guide mounted for reciprocatory movement parallel with the carriage, yielding means for advancing said carriage and guide, a slotted connection between the carriage and guide to allow independent movement of the carriage after the guide engages a saw and enable the guide to be retracted by the carriage, and means for retracting the carriage, substantially as specified.

8. In a saw-sharpening machine, the combination with a disk file and means for actuating the same, of a reciprocatory carriage supporting the file, a reciprocatory file-guide mounted for movement parallel with the carriage, independent yielding means for advancing the carriage and guide, a stud on the carriage operating in a slot of the guide and adapted when moved rearwardly to engage the extremity of the slot and impart rearward movement to the guide, and means for retracting the carriage, substantially as specified.

9. In a saw-sharpening machine, the combination with continuous saw-feeding devices, a disk file and means for rotating the same, said file being capable of reciprocatory movement toward and from the saw to adapt it to be removed from the path of the saw-teeth, of a reciprocatory yielding file-guide projecting beyond the operative surface of the file to engage a throat between contiguous saw-teeth, and being bifurcated to form projections arranged upon opposite sides of the plane of the saw, said guide being arranged at a fixed distance from the plane of the disk file, and capable of yielding longitudinally independently of said file to insure the accurate application of the file to a contiguous tooth, substantially as specified.

10. In a saw-sharpening machine, the combination of a disk file mounted for reciprocatory and axial yielding movement, and means for actuating the same, and a file-guide arranged contiguous to the file to successively engage the teeth of a saw, and mounted for reciprocatory and yielding movement with the file, substantially as specified.

11. In a saw-sharpening machine, the combination with continuous saw-feeding devices, of a carriage mounted for yielding movement in the plane of a saw, a disk file mounted upon the carriage, means for actuating the file, and a file-guide arranged to coöperate with the file and engage a contiguous tooth of a saw, and capable of yielding movement parallel with the axis of the disk file, substantially as specified.

12. In a saw-sharpening machine, the combination with continuous saw-feeding devices, of a reciprocatory carriage mounted for yielding movement in the plane of the saw, a disk file mounted upon the carriage, for axial yielding movement therewith, means for rotating the file, and a reciprocatory yielding file-guide spaced at a fixed distance from the plane of the file and capable of yielding movement with the carriage, in a direction parallel with the axis of the file, said guide being adapted to engage a saw-tooth contiguous to that engaged by the file, substantially as specified.

13. In a saw-sharpening machine, the combination with a shaft and means for operating the same, of reciprocatory files and operating connections, a carriage-guide mounted for lateral adjustment, means for securing said guide at the desired adjustment, a carriage mounted for reciprocation in the guide and capable of lateral adjustment therewith, a disk file mounted upon the carriage and operatively connected with said shaft, and means for reciprocating the carriage, substantially as specified.

14. In a saw-sharpening machine, the combination with a shaft and means for operating the same, of a carriage-guide including a guide-arm and a parallel shoe, a carriage mounted for reciprocation in the shoe, a guide-bolt connecting the guide-arm and shoe and extending through a slot in the carriage, yielding means for normally holding the guide in its depressed position, means for reciprocating the carriage, and a disk file mounted upon the carriage and operatively connected with said shaft, substantially as specified.

15. In a saw-sharpening machine, the combination with a shaft and means for operating the same, of reciprocatory files and means for operating the same, a carriage-guide including a guide-arm pivoted at its rear end and a shoe arranged parallel with said arm, a guide-bolt connecting said arm and shoe, a carriage mounted for reciprocation upon the shoe and slotted to receive the guide-bolt, a spring coiled upon the guide-bolt and bearing terminally upon the guide to yieldingly hold the latter depressed, means for securing the shoe at the desired lateral adjustment with relation to the reciprocatory files, operating devices for the carriage, and a disk file mounted upon the carriage and operatively connected with said shaft, substantially as specified.

16. In a saw-sharpening machine, the combination with a driving-shaft, of a carriage-guide including a guide-arm and a shoe, a guide-bolt connecting said arm and shoe and having a slotted connection with the former, means for adjusting the guide-arm longitudinally, a carriage mounted in the shoe, a disk file having its spindle mounted in bearings on the guide and operating in a longitudinal slot of said guide-arm, connections between the disk-spindle and said shaft including a counter-shaft having a sliding connection with a gear forming one member of the connections between the counter-shaft and the driving-shaft, and means for reciprocating the carriage, substantially as specified.

17. In a saw-sharpening machine, the combination with a driving-shaft and saw-feeding devices, of a counter-shaft operatively geared to the driving-shaft, said gearing including a sliding connection between the counter-shaft and the gear carried thereby, a reciprocatory carriage having an extension 61 connected with the counter-shaft to impart reciprocatory movement thereto with the carriage, means for operating the carriage, and a disk file mounted upon the carriage and permanently geared to the counter-shaft, substantially as specified.

18. In a saw-sharpening machine, the combination with a driving-shaft and saw-feeding devices, of a counter-shaft operatively geared to the driving-shaft, said gearing including a sliding connection between the counter-shaft and the gear carried thereby, a reciprocatory carriage having an extension 61 terminating in upstanding guide-arms 65 between which the contiguous extremity of the counter-shaft is arranged, a removable double-eared clip-plate secured to said extension to engage an annular groove in the counter-shaft, whereby reciprocatory movement may be imparted by the carriage to said shaft, means for operating the carriage, and a disk file having its spindle mounted in the carriage and carrying a gear meshing with a gear on the contiguous extremity of the counter-shaft, substantially as specified.

19. In a saw-sharpening machine, the combination with a base having a rear point of support, and saw-filing devices carried by the base, of a support 105 pivotally connected at one end to the base near its front end and having at the other end a fixed point of support, consisting of a downturned hook or shoe 104, and a set-screw mounted upon the support and terminally engaging the base to vary the angular position of the latter, substantially as specified.

20. In a saw-sharpening machine, the combination of a rocker, file-fingers fulcrumed at intermediate points upon the extremities of the rocker, and capable of independent vertical and lateral movement, means for limiting the outward lateral or spreading movement of the fingers, yielding devices connecting the fingers to hold them normally at the limit of their outward movement, and means for actuating the rocker, substantially as specified.

21. In a saw-sharpening machine, the combination of a rocker, a guiding-stirrup, file-fingers fulcrumed at intermediate points by means of universal joints upon the extremities of the rocker, and capable of vertical and lateral movement, a yielding connection between the rear ends of the fingers to normally hold their front ends spread and in contact with the sides of said guiding-stirrup, and means for actuating the rocker, substantially as specified.

22. In a saw-sharpening machine, the combination with saw-feeding devices, of a rocker, file-fingers fulcrumed upon the rocker, means for holding the front ends of the fingers normally spread, guiding devices for the front ends of the fingers whereby they are capable of movement parallel with the plane of a saw, actuating devices for the rocker, and a trip arranged in the path of movement of the file-fingers parallel with the plane of the saw and adapted to be actuated to depress the fingers to their normal positions, substantially as specified.

23. In a saw-sharpening machine, the combination of continuous saw-feeding devices, a carriage-guide, a carriage mounted in said guide and capable of movement in the plane of a saw, yielding means for resisting the movement of the carriage in the direction of rotation of the saw, actuating devices for the carriage, a disk file mounted upon the carriage and adapted to yield with the latter in the plane of the saw, and means for rotating the file, substantially as specified.

24. In a saw-sharpening machine, the combination with a supporting-frame, of means, as chucks, for engaging a gin-shaft, means for imparting continuous rotary movement to the gin-saw, adjustable front and rear parallel guide-rods, means for securing said rods at the desired adjustment, a sharpening apparatus having a base mounted upon said guide-rods for movement parallel with the gin-shaft, and operating connections between said sharpening devices and the means for actuating the gin-shaft, substantially as specified.

In testimony that I claim the foregoing as my own I have hereto affixed my signature in the presence of two witnesses.

GEORGE W. TAYLOR.

Witnesses:
  W. WILLINGHAM,
  M. E. GEER.